June 4, 1935.   R. V. TERRY   2,003,401
INSPECTION DEVICE
Filed Aug. 27, 1929
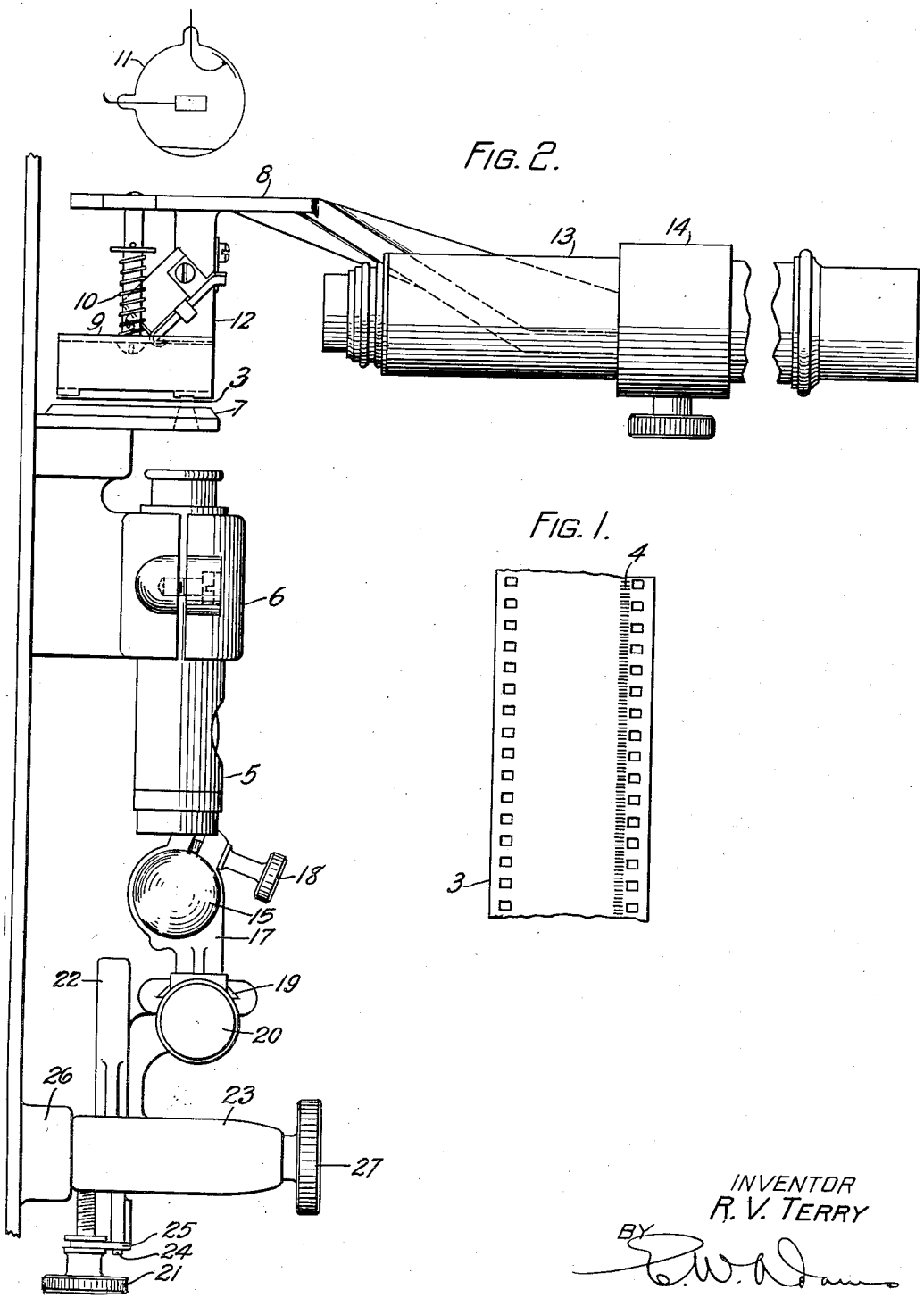
INVENTOR
R. V. TERRY
BY
ATTORNEY Patented June 4, 1935

2,003,401

UNITED STATES PATENT OFFICE 2,003,401

INSPECTION DEVICE

Roy V. Terry, Montclair, N. J., assignor to Bell Telephone Laboratories, Incorporated, New York, N. Y., a corporation of New York Application August 27, 1929, Serial No. 388,674

11 Claims. (Cl. 179—100.3)

This invention relates to sound picture systems of the film type and more particularly to systems in which the sound record is illuminated by a beam of light.

A known method of reproducing sound from a film sound record is to permit a beam of light to fall on the sound record. A portion of this beam, varying in accordance with the variations in transmitting power of the sound record, passes through the film and falls on a photoelectric device. The variations in the output current of the photoelectric device, suitably amplified, actuate sound reproducing devices. The beam of light falling on the sound track should be of uniform width, oriented to have its longest side at right angles to the direction of motion of the film and to be centered on the sound track. The beam should also produce uniform brilliancy over the area of the sound track illuminated and be of known width.

The object of this invention is a method and means of checking the illumination of the sound record.

A feature of this invention is the use of a film sound record of a constant frequency taken at a constant speed to measure the size and location of the area of the sound record illuminated by the beam of light.

Another feature of this invention is an inspection device adapted to be mounted interchangeably with the tension pad of the sound reproducing unit.

A further feature of this invention is the provision of optical means to form a magnified image of the area illuminated.

A photographic sound record of the uniform width, variable density type is made of a known, constant frequency at a known, constant speed. This record will show a series of parallel striations equally spaced on the record. The transmitting band between striations will be constant and may be approximately computed from the relation:

$$D = \frac{S}{2F}$$

where

D = transmitting band between striations in inches

S = speed in inches per second

F = frequency in cycles per second

For example, the record of a 4500 cycle frequency, taken at 18 inches per second will have a band of $$D = \frac{18}{9000} = .002 \text{ inch.}$$

This will be the approximate width of the transmitting band between the dark portions of the striations.

A portion of such a record is threaded through the sound reproducing unit of the projector and adjusted to have the area of illumination of the sound record fall midway between two striations. By observing the area illuminated, the height of the area may be measured by comparison with the distance between striations. The lens tube may be adjusted to cause the area of illumination to be parallel to the striations and to be centered on the sound track, and the optical system and exciting lamp adjusted to produce a sharp image of uniform brilliancy.

Due to the presence of the photoelectric cell and its amplifier, it is difficult to observe the illumination of the sound track. To facilitate the examination of the illumination of the sound track, the preferred embodiment of this invention contemplates the provision of an inspection device. The tension pad in the sound unit which retains the film in place in the light beam is removed and replaced by this inspection device, which comprises a base member arranged to be mounted in the sound unit, for example, by having one end shaped to fit around and be retained by the mounting screws of the tension pad. Mounted on this end of the base member is a tension pad capable of performing the same functions as the tension pad which it replaces. Also mounted on this end of the base member is an optical prism arranged to deflect the light passing through the sound reproducing aperture in the pressure foot. Mounted on the other end of the base member is a low power microscope focussed on the light emerging from the prism, by which the area of illumination of the sound track may be conveniently examined.

In the drawing

Fig. 1 diagrammatically represents a section of film having a constant frequency record imprinted thereon.

Fig. 2 is a plan view of the inspection device in place in the projector.

In Fig. 1 a portion of motion picture film 3 is diagrammatically shown having a photographic record 4 located close to one row of perforations in the manner well known in the art. The record 4 is taken at a constant and known speed and may be the record of a sound of known and constant frequency or the record of an electric current varying sinusoidally at a constant frequency. The record 4 is preferably of the constant width variable density type well known in the art, though records of other types may be used. If the record is of the variable density type, it will be a series of equally spaced striations having the opaque portions nearly equal to the transparent portions. The width of the transparent portions may be calculated as shown above.

Referring to Fig. 2, a lens tube 5 which may be of the type illustrated by Fig. 4 on page 387 of the Cinematographic Annual 1930 published by the American Society of Cinematographers, comprising a condensing lens, an opaque diaphragm pierced by a small slit, and a projecting lens assembled in a unitary device is secured by the clamp 6 to the sound reproducing unit of the sound picture projector which may be of the type described in an article by E. O. Scriven in the transactions of the Society of Motion Picture Engineers, volume XII, No. 35, page 666 et seq. When the lens tube is used for the reproduction of sound the film sound record is yieldingly retained in contact with the sound aperture plate 7 by a tension pad (not shown) of the sound picture projector. To check the adjustment of the lens tube 5, the tension pad in the sound reproducing unit is removed, and replaced by a base 8, supporting a tension pad 9 yieldingly pressed against the sound aperture plate 7 by the springs 10. A section of film 3 similar to the film shown in Fig. 1 is threaded in the sound reproducing unit and adjusted between the sound aperture plate 7 and the tension pad 9. Light from the exciting lamp 15 of the sound reproducing unit is directed on the lens tube 5 which forms an image of the slit on the film 3.

In normal use the light transmitted through the film reaches a photoelectric cell 11, causing a current modulated in accordance with sound to flow which current is amplified and used to actuate sound radiators in the theatre. In the present invention, the light transmitted through the film falls on a totally reflecting optical prism 12, or similar device, and is deflected through a low power microscope 13, held in a clamp 14 supported on an extension of the base 8. An observer looking through the microscope 13 will see a magnified image of the area of the film illuminated by the light passing through the slit in the lens tube 5, and can estimate the size of the image and check its location by comparison with the image of the striations on the film.

To secure a reproduction of the sound record which is free from distortion the image of the slit in the lens tube 5 formed on the film 3 must be evenly illuminated and of uniform brilliancy over the whole area of the image. Also, due to the small size of the slit, the image of the light formed on the slit should be of high brilliancy so that enough light energy will pass through the film to properly operate the photoelectric cell 11. The exciting lamp 15 (of which a plan view is shown) is generally an electric incandescent lamp in which the light is emitted by a filament of high brilliancy, and in which the emitted light is in zones of unequal brilliancy. Thus the position of lamp 15 must be carefully adjusted to secure an even illumination of the slit of maximum brilliancy. This adjustment should be repeated whenever the exciting lamp is replaced.

A convenient method of mounting the exciting lamp 15 so that it may be easily adjusted is disclosed in Fig. 2. The lamp 15 is retained in the clamp 17 by the screw 18. The clamp 17 is slidably mounted in the V groove 19 and may be moved up and down by the screw 20, which is of a similar design to the screw 21. The V groove 19 is machined in a projection formed on the slide 22 which is slidably mounted in a V groove formed in the base 23. The outer end of the slide 22 is secured by the screw 24 to the yoke 25 which rotatably engages a groove cut in the head of screw 21. Screw 21 engages a thread tapped in the base 23. Rotating the screw 21 will cause the screw to move forward or back carrying the yoke 25 and slide 22 with it, moving the lamp 15 to or from the lens tube 5. The base 23 is slidably supported by a pin (not shown) secured in the boss 26 formed on the wall of the projector. A screw 27 threaded in the base 23 engages the end of the pin and regulates the position of the lamp 15 laterally of the lens tube 5. Flexible conductors (not shown) are provided to conduct the current to the lamp 15. The illumination of the film is observed through the microscope 13, and the lamp 15 is moved in any desired direction by manipulating the screws 20, 21 or 27 until the observed illumination is of maximum brilliancy and uniform over the illuminated area.

What is claimed is:

1. The method of adjusting a sound film reproducer which comprises threading a flexible, uniformly striated screen through said reproducer, focussing an image of a rectangular, illuminated slit on said screen, deflecting the image transmitted through said screen, magnifying said deflected image, visually comparing said magnified image with the magnified image of said striated screen, and adjusting the position of said slit until the image of said slit is parallel to the striations on said screen.

2. In a device for measuring the area of illumination of the sound record in a sound picture projector in combination, a film sound record having striations of known spacing on which said illumination falls, means for yieldingly retaining said sound record in place, a viewing device, a member for deflecting the light transmitted through said record to said viewing device, whereby the height of said illuminated area may be compared with the known spacing of the striations on said record.

3. In a device for measuring the area of illumination of the sound record in a sound picture projector, in combination, a film sound record having striations of known spacing, a tension pad for yieldingly retaining said sound record in said illuminated area, an optical prism, and means for viewing the image of the film transmitted by said prism whereby the height of said area may be compared with the known spacing of said striations.

4. In a device for measuring the area of illumination produced by the sound lamp and lens tube of a sound picture projector, in combination, a film sound record having striations of known spacing, an opaque plate pierced by an aperture aligned with the correct location of said area, means for yieldingly retaining said sound record in line with said aperture and against said plate, an optical prism and a microscope focussed to magnify the image of said area with respect to the striations of said record transmitted by said prism.

5. In a device for measuring the area of illumination produced by the sound lamp and lens tube of a sound picture projector, in combination, a film having striations of known spacing, a tension pad mounted on a base interchangeable with the base of the tension pad of the projector, means for deflecting the light transmitted through said film, a device for viewing the light transmitted through said prism, whereby the height of said area may be compared with the known spacing of said striations after deflection.

6. In a device for measuring the area of illumination produced by the sound lamp and lens tube of a sound picture projector, in combination, a film record of a single, constant, sinusoidal current taken at constant speed, and an inspection device comprising a base member interchangeable with the base member of the tension pad of said projector, a tension pad mounted on said member, a microscope, a prism mounted on said base member and arranged to deflect the light transmitted through said film to said microscope, whereby the area of illumination may be compared with the record of said current.

7. In a machine for producing sound from a photographic sound record, means for producing a scanning light, a film gate for directing said sound record past said light, a support therefor, and a microscope for facilitating adjustment of said light, means for supporting said microscope comprising a housing having an aperture therein, a prism supporting means mounted adjacent said aperture for changing the angle of the scanning light, and means for mounting said housing upon said film gate support interchangeably with said film gate.

8. In combination with a photographic sound reproducing mechanism including a light source, aperture plate and photoelectric cell, a microscope for adjusting said mechanism, said microscope carrying a light deflecting member, means for mounting said microscope between said light source and said photoelectric cell with its axis at approximately right angles to the axis of the scanning ray and with said deflecting member in the path of said ray whereby said ray is deflected and focused in said microscope to permit adjustment of said ray without removing the photoelectric cell.

9. In a photographic sound reproducing apparatus including means for producing a scanning ray, a photographic sound record, a film gate for directing said record past said scanning ray, a support for said film gate and a microscope for facilitating adjustment of said ray, and means for supporting said microscope upon said film gate support interchangeably with said film gate.

10. In a machine for scanning a photographic sound record, an aperture plate for directing a scanning light onto said sound record, a microscope, means for mounting said microscope with its axis at substantially right angles to the scanning light, a light deflecting member for deflecting said scanning light along the axis of said microscope, means for mounting said microscope adjacent said aperture plate, and means for adjusting said microscope vertically and horizontally with respect thereto for bringing said light deflecting means into alignment with said scanning light.

11. In combination with a motion picture projection machine, a device associated therewith for scanning a photographic sound record, mechanism for facilitating adjustment of said scanning mechanism, a film gate for directing said photographic record past said scanning mechanism, and a single support carrying interchangeably said adjusting mechanism and said film gate.

ROY V. TERRY.